(12) United States Patent
Baviloliaie et al.

(10) Patent No.: US 12,202,214 B2
(45) Date of Patent: Jan. 21, 2025

(54) INTERLAYER, A SPAR CAP AND A WIND TURBINE BLADE

(71) Applicants: LM WIND POWER A/S, Kolding (DK); BLADE DYNAMICS LIMITED, Eastleigh (GB)

(72) Inventors: Mahdi Baviloliaie, Kolding (DK); Jeppe Jørgensen, Kolding (DK); Rama Razeghi, Eastleigh (GB); Michael Koefoed, Kolding (DK); Jens Zangenberg Hansen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/911,927

(22) PCT Filed: Apr. 28, 2020

(86) PCT No.: PCT/EP2020/061761
§ 371 (c)(1),
(2) Date: Sep. 15, 2022

(87) PCT Pub. No.: WO2021/219204
PCT Pub. Date: Nov. 4, 2021

(65) Prior Publication Data
US 2023/0135034 A1 May 4, 2023

(51) Int. Cl.
*B29C 70/24* (2006.01)
*B29C 70/88* (2006.01)
(Continued)

(52) U.S. Cl.
CPC ............ *B29C 70/24* (2013.01); *B29C 70/885* (2013.01); *F03D 1/0675* (2013.01); *B29L 2031/085* (2013.01)

(58) Field of Classification Search
None
See application file for complete search history.

(56) References Cited

U.S. PATENT DOCUMENTS 5,100,713 A 3/1992 Homma et al.
8,916,310 B2 * 12/2014 Kurokawa .......... H01M 8/0234
429/484
(Continued)

FOREIGN PATENT DOCUMENTS

DE 102014104266 A1 10/2015
DE 102016009640 A1 2/2018
(Continued)

*Primary Examiner* — Kayla Mccaffrey
(74) *Attorney, Agent, or Firm* — Nath, Goldberg & Meyer; Jerald L. Meyer; Tanya E. Harkins

(57) ABSTRACT

The present disclosure relates to an interlayer for being arranged between a first element and a second element of a fibre reinforced composite material, the interlayer comprises an interlayer sheet comprising one or more fibre layers extending in a fibre layer plane, the one or more fibre layers including a first fibre layer comprising a first plurality of fibres and having a first upper fibre surface and a first lower fibre surface, wherein the interlayer sheet has an upper interlayer surface and a lower interlayer surface and wherein the interlayer comprises a plurality of conductive fibres, wherein each of the plurality of conductive fibres forms part of the upper interlayer surface as well as the lower interlayer surface.

24 Claims, 10 Drawing Sheets

(51) Int. Cl.
*F03D 1/06* (2006.01)
*B29L 31/08* (2006.01)

(56) References Cited

U.S. PATENT DOCUMENTS

| | | | |
|---|---|---|---|
| 2014/0178204 A1* | 6/2014 | Livingston | B29C 70/443 |
| | | | 29/889.7 |
| 2016/0221272 A1* | 8/2016 | Koefoed | B29C 70/02 |
| 2017/0082089 A1 | 3/2017 | Yarbrough et al. | |
| 2018/0065337 A1* | 3/2018 | Grasso | B32B 15/04 |
| 2018/0223798 A1 | 8/2018 | Caruso et al. | |
| 2019/0211806 A1* | 7/2019 | Girolamo | B29D 99/0025 |
| 2019/0353143 A1* | 11/2019 | Girolamo | B29D 99/0025 |
| 2020/0263657 A1* | 8/2020 | Badger | F03D 3/062 |
| 2020/0300216 A1* | 9/2020 | Girolamo | F03D 1/0675 |
| 2021/0331789 A1* | 10/2021 | Wardlaw | B64F 5/10 |

FOREIGN PATENT DOCUMENTS

| | | |
|---|---|---|
| EP | 1473132 B1 | 8/2010 |
| EP | 2636897 B1 | 7/2017 |
| EP | 3060385 B1 | 10/2017 |
| EP | 3477097 A1 | 5/2019 |
| EP | 3002355 B1 | 4/2020 |
| WO | 2009/083531 A1 | 7/2009 |
| WO | 2018/029240 A1 | 2/2018 |
| WO | 2020/003991 A1 | 1/2020 |

\* cited by examiner

INTERLAYER, A SPAR CAP AND A WIND TURBINE BLADE

This is a National Phase Application filed under 35 U.S.C. 371 as a national stage of PCT/EP2020/061761, filed Apr. 28, 2020, the content of which is hereby incorporated by reference in its entirety.

The present disclosure relates to an interlayer. Particularly, an interlayer for being arranged between a first element and a second element of a conductive fibre reinforced composite material. The present disclosure also relates to a spar cap comprising an interlayer, and a wind turbine blade comprising such spar cap.

BACKGROUND

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbine blades increases, various challenges arise from such blades being subject to increased forces during operation, requiring improved reinforcing structures. The manufacturing of large reinforcing structures, such as spar caps or spar beams, is likewise challenging, in particular when pultruded, carbon fibre-reinforced spar caps are used as the reinforcing members. Carbon fibres are typically lighter than glass fibres by volume and have improved tensile and compressive strength. However, laminate defects, such as voids, wrinkles or misaligned fibres, may have disadvantageous effects on mechanical properties.

Use of pultruded elements, for example in the spar cap, in particular when used in combination with a vacuum infused resin transfer moulding (VARTM) process, comprise the difficulty of ensuring complete resin infusion and adherence between the individual pultruded elements.

Furthermore, when using pultruded elements, comprising conductive fibres, e.g. pultruded carbon elements, there is a risk that during a thunderstorm a voltage differential may occur between individual pultruded elements if the fibres of one pultruded element and the fibres of other pultruded elements are not electrically coupled. Such voltage differential may cause damage or even fire in the component.

SUMMARY

It is an object of the present disclosure to provide an interlayer, and associated spar cap and wind turbine, that provides improved performance over the prior art. Particularly, it is an object of the present disclosure to provide an interlayer for being arranged between a first element comprising conductive parts and a second element comprising conductive parts of a fibre reinforced composite material, e.g. a spar cap, such as a spar cap of a wind turbine blade, decreasing the risk of damage caused by lightning and/or facilitating the structural strength of the fibre reinforced composite material.

Thus, the present disclosure relates to an interlayer sheet and an interlayer comprising an interlayer sheet, as well as a spar cap comprising an interlayer, and a wind turbine comprising a spar cap with an interlayer. The interlayer may comprise a veil or a sheet, e.g. a thin sheet of fibre material, optionally maintained by a binder.

Accordingly, an interlayer is disclosed, such as an interlayer for being arranged between a first element, such as a first pultruded element, and a second element, such as a second pultruded element, of a conductive material, such as a conductive fibre reinforced composite material. For example, the first element and the second element may be carbon elements, e.g. may be of carbon fibre reinforced composite material. The fibre reinforced composite material may be a spar cap of a wind turbine blade. The interlayer may comprise one or more sheets, e.g. comprising an interlayer sheet and optionally a top sheet and/or a bottom sheet. The interlayer sheet comprises one or more fibre layers extending in a fibre layer plane. The one or more fibre layers include a first fibre layer comprising a first plurality of fibres and having a first upper fibre surface and a first lower fibre surface. The interlayer sheet has an upper interlayer surface and a lower interlayer surface and the interlayer comprises a plurality of conductive fibres, such as carbon fibres and/or metal fibres, such as copper fibres and/or steel fibres, wherein each of the plurality of conductive fibres forms part of the upper interlayer surface as well as the lower interlayer surface.

Also disclosed is a spar cap for a wind turbine blade. The spar cap comprises a plurality of elements, such as a plurality of pultruded elements, of a conductive material, such as a conductive fibre reinforced composite material, e.g. carbon fibre reinforced composite material. The plurality of elements includes a first element, e.g. a first pultruded element, and a second element, e.g. a second pultruded element. The first element may be a first carbon element, such as a first pultruded carbon element. The second element may be a second carbon element, such as a second pultruded carbon element. The spar cap further comprises an interlayer, such as the interlayer as disclosed above, wherein the interlayer is arranged between the first element and the second element. The interlayer may be arranged between the elements in a width direction (horizontal) and/or between elements in a thickness direction (vertical). The first element and the second element may be adjacent elements in the thickness direction or the first element and the second element may be adjacent elements in the width direction.

Also disclosed is a wind turbine blade comprising a spar cap, such as the spar cap as disclosed above. The wind turbine blade may comprise two spar caps according to the spar cap as disclosed herein. For example, the wind turbine blade may comprise a first spar cap in a first blade shell part and a second spar cap in a second blade shell part. The first spar cap may be a pressure side spar cap of a pressure side blade shell part. The second spar cap may be a suction side spar cap of a suction side blade shell part.

The plurality of elements of conductive material, such as the first element and/or the second element, may have a length in a longitudinal direction, a width in a width direction, and a height in a height direction. The length may be longer than the width and the width may be longer than the height. The length may be more than 20 meters, such as more than 40 meters, such as more than 70 meters. The width may be between 20-200 mm, such as between 50-150 mm, such as 100 mm. The height may be between 2-10 mm, such as 5 mm.

Each of the plurality of elements of conductive material, such as each of the first element and the second element, may have a lower surface and an upper surface extending in the longitudinal direction and the width direction. Each of the plurality of elements may have a first side surface and a second side surface extending in the longitudinal direction and the height direction. Each of the plurality of elements may have a first end surface and a second end surface extending in the width direction and the height direction.

The first element and the second element may be arranged such that the lower surface of the first element is facing the upper surface of the second element. The interlayer may be arranged between the lower surface of the first element and the upper surface of the second element.

The presence of conductive fibres, such as carbon fibres and/or metal fibres, such as steel and/or copper fibres, extending through the interlayer, such as through the interlayer sheet, provides conductivity of the interlayer in a direction perpendicular to the fibre layer plane, i.e. between the lower interlayer surface and the upper interlayer surface of the interlayer sheet. In case the interlayer comprises a top sheet and/or a bottom sheet, these may comprise conductive fibres, or may facilitate electrical conductivity perpendicular to the fibre layer plane by other means. For example, the interlayer sheet, the top sheet and/or the bottom sheet, may be stitched or woven by a plurality of fibres, e.g. including a plurality of conductive fibres. Alternatively or additionally, the top sheet and/or the bottom sheet may be carbon surface veils. Thus, a plurality of conductive paths are established between elements sandwiching the interlayer. When the conductive fibres, such as carbon fibres and/or metal fibres, such as copper fibres and/or steel fibres, are in contact with both elements and electrically couple them through the interlayer, flow of electrons between the two elements are facilitated. Thereby decreasing the risk of having a voltage differential between the two elements.

The upper interlayer surface and the lower interlayer surface may be defined as the two largest surfaces of the interlayer sheet. The upper interlayer surface may be opposite the lower interlayer surface.

The first upper fibre surface and the first lower fibre surface may be defined as the two largest surfaces of the first fibre layer. The first upper fibre surface may be opposite the first lower fibre surface.

The first upper fibre surface may be the upper interlayer surface. The first lower fibre surface may be the lower interlayer surface.

The one or more fibre layers may include a second fibre layer having a second upper fibre surface and a second lower fibre surface. Alternatively or additionally, the one or more fibre layers may include a third fibre layer having a third upper fibre surface and a third lower fibre surface.

The second upper fibre surface and the second lower fibre surface may be defined as the two largest surfaces of the second fibre layer. The second upper fibre surface may be opposite the second lower fibre surface. The third upper fibre surface and the third lower fibre surface may be defined as the two largest surfaces of the third fibre layer. The third upper fibre surface may be opposite the third lower fibre surface.

The first fibre layer may be arranged between the second fibre layer and the third fibre layer. The second lower fibre surface may be the lower interlayer surface. The third upper fibre surface may be the upper interlayer surface. The second upper fibre surface may be facing the first lower fibre surface. The first upper fibre surface may be facing the third lower fibre surface.

The first plurality of fibres may comprise a first plurality of glass fibres. Additionally or alternatively, the first plurality of fibres may comprise a first plurality of polymeric filaments. Additionally or alternatively, the first plurality of fibres may comprise conductive fibres, e.g. carbon fibres, such as the plurality of conductive fibres or a first plurality of conductive fibres, such as a first plurality of conductive fibres of the plurality of conductive fibres. The first plurality of conductive fibres may be a first plurality of carbon fibres. The first plurality of fibres may be randomly oriented in the first fibre layer. The plurality of conductive fibres may comprise the first plurality of carbon fibres.

The first fibre layer may comprise a binding agent. The binding agent may maintain arrangement of the first plurality of fibres relative to each other. Alternatively or additionally, the first plurality of fibres may be stitched or woven together to maintain arrangement of the first plurality of fibres relative to each other. The first plurality of fibres may be stitched together with one or more threads, e.g. including a first conductive fibre thread, such as a first carbon fibre thread. The plurality of conductive fibres may comprise the first conductive fibre thread.

The second fibre layer may comprise a second plurality of fibres. The second plurality of fibres may comprise a second plurality of glass fibres. Additionally or alternatively, the second plurality of fibres may comprise a second plurality of polymeric filaments. Additionally or alternatively, the second plurality of fibres may comprise conductive fibres, e.g. carbon fibres, such as the plurality of conductive fibres or a second plurality of conductive fibres of the plurality of conductive fibres. The second plurality of fibres may be randomly oriented in the second fibre layer.

The second fibre layer may comprise a binding agent. The binding agent may maintain arrangement of the second plurality of fibres relative to each other. Alternatively or additionally, the second plurality of fibres may be stitched together to maintain arrangement of the first plurality of fibres relative to each other. The second plurality of fibres may be stitched together with one or more threads, e.g. including a second conductive fibre thread, such as a second carbon fibre thread. The plurality of conductive fibres may comprise the second conductive fibre thread.

The third fibre layer may comprise a third plurality of fibres. The third plurality of fibres may comprise a third plurality of glass fibres. Additionally or alternatively, the third plurality of fibres may comprise a third plurality of polymeric filaments. Additionally or alternatively, the third plurality of fibres may comprise conductive fibres, e.g. carbon fibres, such as the plurality of conductive fibres or a third plurality of conductive fibres of the plurality of conductive fibres. The third plurality of fibres may be randomly oriented in the third fibre layer.

The third fibre layer may comprise a binding agent. The binding agent may maintain arrangement of the third plurality of fibres relative to each other. Alternatively or additionally, the third plurality of fibres may be stitched together to maintain arrangement of the third plurality of fibres relative to each other. The third plurality of fibres may be stitched together with one or more threads, e.g. including a third conductive fibre thread, such as a third carbon fibre thread. The plurality of conductive fibres may comprise the third conductive fibre thread.

The polymeric filaments, e.g. of the first, second and/or third plurality of polymeric filaments, may be polyester filaments, polypropylene filaments and/or polyethylene filaments. The polymeric filaments may be thermoplastic filaments, such as thermoplastic polyester filaments, thermoplastic polypropylene filaments and/or thermoplastic polyethylene filaments. The use of polymeric filaments in the interlayer promotes resin infusion, gives good filling between elements, such as pultruded elements, and reduces the amount of defects.

The first fibre layer may essentially consist of the first plurality of polymeric filaments. Optionally, the first plurality of polymeric filaments maintained relative to each other by a binder. Thus, the first fibre layer may essentially consist of the first plurality of polymeric filaments and a binder. In some embodiments, the first fibre layer may be a polymeric surface veil, such as a polyester surface veil.

Alternatively, the first fibre layer may essentially consist of the first plurality of glass fibre. Optionally, the first plurality of glass fibres are maintained relative to each other by a binder. Thus, the first fibre layer may essentially consist of the first plurality of glass fibre and a binder.

The second fibre layer may essentially consist of the second plurality of polymeric filaments. Optionally, the second plurality of polymeric filaments maintained relative to each other by a binder. Thus, the second fibre layer may essentially consist of the second plurality of polymeric filaments and a binder. In some embodiments, the second fibre layer may be a polymeric surface veil, such as a polyester surface veil.

Optionally, the second fibre layer is a polyester surface veil. A polyester surface veil is a thin layer of material essentially consisting of polyester fibres and optionally a binder for maintaining the polyester fibres. Typically, the polyester fibres are randomly dispersed throughout the layer. A polyester surface veil gives good adhesion properties and are thus advantageous to have as an outer layer of the interlayer, since it is then configured to be in contact with and adhere to an element, such as a pultruded element.

Alternatively, the second fibre layer may be a carbon surface veil. A carbon surface veil is a thin layer of material essentially consisting of carbon fibres and optionally a binder for maintaining the carbon fibres. Typically, the carbon fibres are randomly dispersed throughout the layer. A carbon veil also has high permeability, promotes resin infusion and have good adhesion properties. Furthermore, a carbon surface veil provides conductive properties to the interlayer.

The third fibre layer may essentially consist of the third plurality of polymeric filaments. Optionally, the third plurality of polymeric filaments maintained relative to each other by a binder. Thus, the third fibre layer may essentially consist of the third plurality of polymeric filaments and a binder. In some embodiments, the third fibre layer may be a polymeric surface veil, such as a polyester surface veil.

Optionally, the third fibre layer is a polyester surface veil. A polyester surface veil is a thin layer of material essentially consisting of polyester fibres and optionally a binder for maintaining the polyester fibres. Typically, the polyester fibres are randomly dispersed throughout the layer. A polyester surface veil gives good adhesion properties and are thus advantageous to have as an outer layer of the interlayer, since it is then configured to be in contact with and adhere to an element, such as a pultruded element.

Alternatively, the third fibre layer may be a carbon surface veil. A carbon surface veil is a thin layer of material essentially consisting of carbon fibres and optionally a binder for maintaining the carbon fibres. Typically, the carbon fibres are randomly dispersed throughout the layer. A carbon veil also has high permeability, promotes resin infusion and have good adhesion properties. Furthermore, a carbon surface veil provides conductive properties to the interlayer.

One or more of the first fibre layer, the second fibre layer and/or the third fibre layer, may be non-woven fabric layers. Alternatively or additionally, one or more of the first fibre layer, the second fibre layer and/or the third fibre layer may be a woven fabric. For example, the first plurality of fibres may be woven together. Alternatively or additionally, the second plurality of fibres may be woven together. Alternatively or additionally, the third plurality of fibres may be woven together.

Each of the plurality of conductive fibres may comprise a first part. Each of the plurality of conductive fibres may comprise a second part and/or a third part. The first part may be between the second part and the third part. The first part of each of the plurality of conductive fibres may extend through the one or more fibre layers. The second part of each of the plurality of conductive fibres may be arranged randomly at the upper interlayer surface. The third part of each of the plurality of conductive fibres may be arranged randomly at the lower interlayer surface.

Each of the plurality of conductive fibres may comprise a fourth part. Each of the plurality of conductive fibres may comprise a fifth part. The fourth part may be between the second part and the fifth part. The fourth part of each of the plurality of conductive fibres may extend through the one or more fibre layers. The fifth part of each of the plurality of conductive fibres may be arranged randomly at the lower interlayer surface.

Each of the plurality of glass fibres, e.g. the first plurality of glass fibres, the second plurality of glass fibres and/or the third plurality of glass fibres, may comprise a first part. Each of the plurality of glass fibres may comprise a second part and/or a third part. The first part may be between the second part and the third part. The first part of each of the plurality of glass fibres may extend through the one or more fibre layers. The second part of each of the plurality of glass fibres may be arranged randomly at the upper interlayer surface. The third part of each of the plurality of glass fibres may be arranged randomly at the lower interlayer surface.

Each of the plurality of glass fibres may comprise a fourth part. Each of the plurality of glass fibres may comprise a fifth part. The fourth part may be between the second part and the fifth part. The fourth part of each of the plurality of glass fibres may extend through the one or more fibre layers. The fifth part of each of the plurality of glass fibres may be arranged randomly at the lower interlayer surface.

By a part of a fibre being randomly arranged at the upper interlayer surface and/or the lower interlayer surface is meant that the fibre is arranged such that the part forms part of the upper interlayer surface and/or the lower interlayer surface.

A plurality of the one or more fibre layers, such as the first fibre layer and the second fibre layer or the first fibre layer, the second fibre layer and the third fibre layer may be stitched together to maintain arrangement of the plurality of the one or more fibre layers. The plurality of the one or more fibre layers, such as the first fibre layer and the second fibre layer or the first fibre layer, the second fibre layer and the third fibre layer may be stitched together with one or more threads, e.g. including a first conductive fibre thread, such as a first carbon fibre thread. For example, the plurality of the one or more fibre layers, such as the first fibre layer and the second fibre layer or the first fibre layer, the second fibre layer and the third fibre layer may be stitched together by the plurality of conductive fibres.

The interlayer sheet, such as the one or more fibre layers, e.g. the first fibre layer, may comprise 10-45 wt % carbon fibres, such as 15-45 wt %. The interlayer sheet, such as the one or more fibre layers, e.g. the first fibre layer, may comprise 5-50 wt % polymeric material, e.g. polymeric filaments, such as 10-50 wt %. The interlayer sheet, such as the one or more fibre layers, e.g. the first fibre layer, may comprise 15-50 wt % glass fibres, such as 20-50 wt %. For example, the interlayer sheet, such as the one or more fibre layers, e.g. the first fibre layer, may comprise 10-45 wt % carbon fibres, 5-50 wt % polymeric filaments and 15-50 wt % glass fibres. Alternatively, the interlayer sheet may comprise 15-45 wt % carbon fibres, 10-50 wt % polymeric material and 20-50 wt % glass fibres.

The plurality of fibres may be arranged to extend along certain directions. For example, each of the first plurality of conductive fibres may be arranged to extend along a first length direction. Each of the first plurality of glass fibres may be arranged to extend along a second length direction. Each of the first plurality of polymeric filaments may be arranged to extend along a third length direction. For example the plurality of first fibres may be arranged to extend along certain directions in situations where the first fibre layer is a woven fabric or a unidirectional/biaxial/triaxial non-woven fabric. The first length direction and the second length direction may be parallel. The third length direction may be perpendicular to the first length direction and/or second length direction. The first length direction and third length direction may be parallel. The second length direction may be perpendicular to the first length direction and/or the third length direction.

The plurality of fibres may be arranged in a plurality of fibre bundles. For example, the first plurality of glass fibres may be arranged in a plurality of glass fibre bundles. The first plurality of conductive fibres may be arranged in a plurality of conductive fibre bundles. The first fibre layer may comprise alternating glass fibre bundles and conductive fibre bundles, e.g. alternating in a direction, such as the first length direction, the second length direction or the third length direction.

The plurality of fibres arranged to extend along the first length direction may comprise alternating polymeric filaments and conductive fibres, e.g. alternating perpendicular to the first length direction. The conductive fibres may be bundles of carbon fibres, e.g. since the diameter of carbon fibres are much smaller than that of polymeric filaments. The conductive fibres may also be another type of conductive fibres, e.g. metal fibres, such as copper fibres and/or steel fibres. The plurality of fibres arranged to extend along the first length direction may comprise polymeric filaments and conductive fibres, distributed such that every Xth fibre or fibre bundle arranged to extend along the first length direction comprise conductive fibres, whereas the remaining fibres arranged to extend along the first length direction are polymeric filaments. X may be between 2 and 15, such as between 6-13, such as 10. In this way, the interlayer is resin promoting and conductive at the same time. The plurality of fibres arranged along the first length direction may be stitched or woven together by a plurality of fibres arranged to extend along the second length direction. For example, the fibres used for stitching or weaving together the plurality of fibres arranged to extend along the first length direction, are preferably glass fibres. However, conductive fibres, such as carbon fibres, may also be used, e.g. for every Xth fibre arranged along the second length direction. X may be between 2 and 15, such as between 6-13, such as 10.

Some or all of the plurality of fibres, e.g. the first plurality of fibres, such as the first plurality of glass fibres, the first plurality of polymeric filaments or the first plurality of conductive fibres, the second plurality of fibres, such as the second plurality of glass fibres, the second plurality of polymeric filaments or the second plurality of conductive fibres, or the third plurality of fibres, such as the third plurality of glass fibres, the third plurality of polymeric filaments or the third plurality of conductive fibres, may comprise short fibres, e.g. having a length below 100 mm, such as between 5-100 mm.

Some or all of the plurality of fibres, e.g. the first plurality of fibres, such as the first plurality of glass fibres, the first plurality of polymeric filaments or the first plurality of conductive fibres, the second plurality of fibres, such as the second plurality of glass fibres, the second plurality of polymeric filaments or the second plurality of conductive fibres, or the third plurality of fibres, such as the third plurality of glass fibres, the third plurality of polymeric filaments or the third plurality of conductive fibres, may comprise continuous fibres, e.g. having a length longer than 100 mm, such as between 100-200 mm.

The interlayer may comprise a top sheet. Alternatively or additionally, the interlayer may comprise a bottom sheet. The top sheet may be arranged adjacent the upper interlayer surface. The bottom sheet may be arranged adjacent the lower interlayer surface. The interlayer sheet may be arranged between the bottom sheet and the top sheet. For example, the interlayer sheet may be sandwiched between the top sheet and the bottom sheet. The top sheet and/or the bottom sheet may comprise polymeric or conductive fibres, such as carbon fibres. The top sheet and/or the bottom sheet may be a carbon surface veil. A carbon veil has high permeability, promotes resin infusion and have good adhesion properties. Furthermore, a carbon surface veil provides conductive properties to the interlayer. Alternatively, the top sheet and/or the bottom sheet may be a polyester surface veil. A polyester surface veil has good adhesion properties. In the case the top sheet and/or bottom sheet is a polyester surface veil, the top sheet and/or bottom sheet may comprise conductive fibres, e.g. carbon fibres, extending through the sheet to facilitate electrical conductivity perpendicular to the fibre layer plane.

BRIEF DESCRIPTION OF THE FIGURES

Embodiments of the disclosure will be described in more detail in the following with regard to the accompanying figures. The figures show one way of implementing the present disclosure and are not to be construed as being limiting to other possible embodiments falling within the scope of the attached claim set.

DETAILED DESCRIPTION

Figure 1:
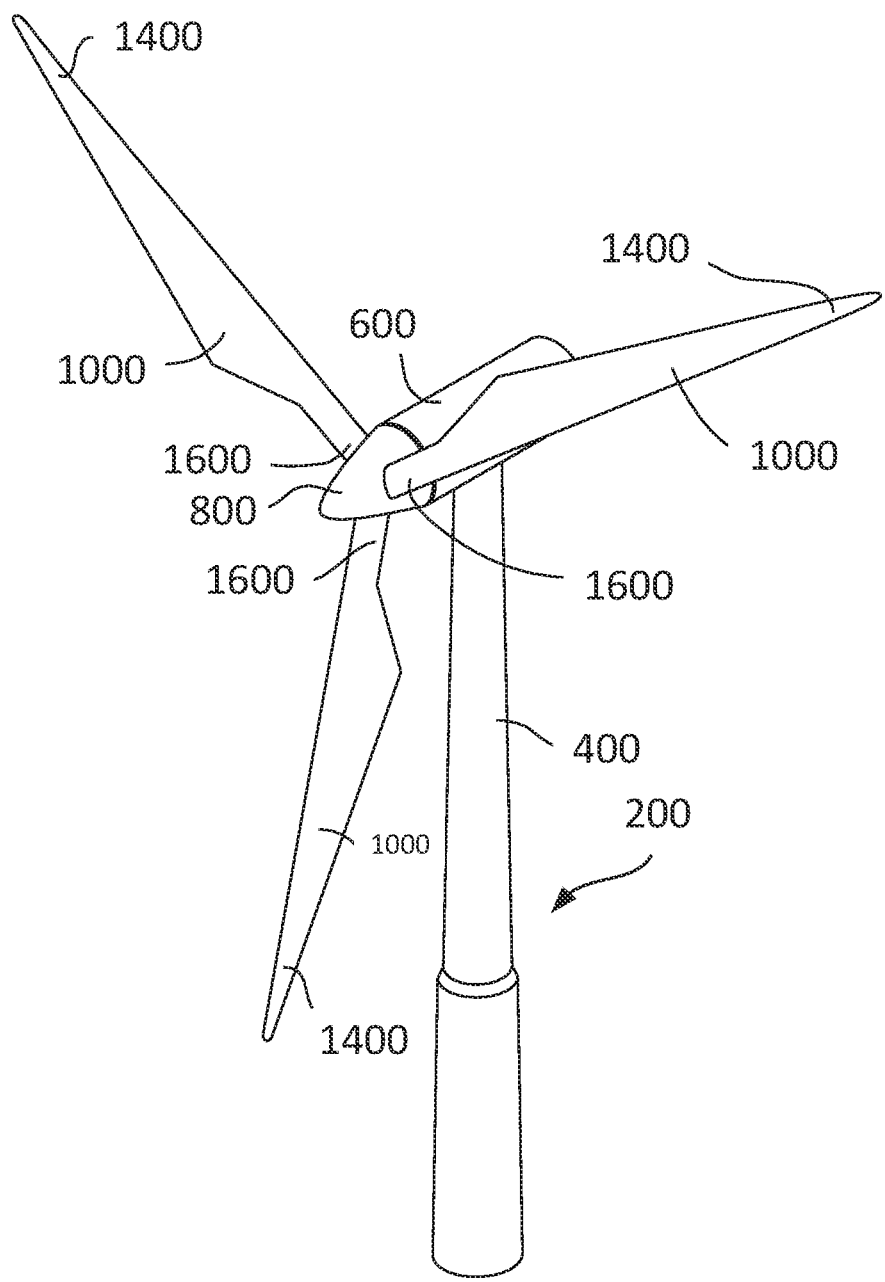
FIG. 1 is a schematic diagram illustrating a wind turbine.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a conventional modern upwind wind turbine according to the so-called "Danish concept" with a tower 400, a nacelle 600 and a rotor with a substantially horizontal rotor shaft. The rotor includes a hub 800 and three blades 1000 extending radially from the hub 800, each having a blade root 1600 nearest the hub and a blade tip 1400 furthest from the hub 800.

FIG. 2A shows a schematic view of a first embodiment of a wind turbine blade 1000. The wind turbine blade 1000 has the shape of a conventional wind turbine blade and comprises a root region 3000 closest to the hub, a profiled or an airfoil region 3400 furthest away from the hub and a transition region 3200 between the root region 3000 and the airfoil region 3400. The blade 1000 comprises a leading edge 1800 facing the direction of rotation of the blade 1000, when the blade is mounted on the hub, and a trailing edge 2000 facing the opposite direction of the leading edge 1800.

The airfoil region 3400 (also called the profiled region) has an ideal or almost ideal blade shape with respect to generating lift, whereas the root region 3000 due to structural considerations has a substantially circular or elliptical cross-section, which for instance makes it easier and safer to mount the blade 1000 to the hub. The diameter (or the chord) of the root region 3000 may be constant along the entire root area 3000. The transition region 3200 has a transitional profile gradually changing from the circular or elliptical shape of the root region 3000 to the airfoil profile of the airfoil region 3400. The chord length of the transition region 3200 typically increases with increasing distance r from the hub. The airfoil region 3400 has an airfoil profile with a chord extending between the leading edge 1800 and the trailing edge 2000 of the blade 1000. The width of the chord decreases with increasing distance r from the hub.

A shoulder 4000 of the blade 1000 is defined as the position, where the blade 1000 has its largest chord length. The shoulder 4000 is typically provided at the boundary between the transition region 3200 and the airfoil region 3400.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 2B is a schematic diagram illustrating a cross sectional view of an exemplary wind turbine blade 1000, e.g. a cross sectional view of the airfoil region of the wind turbine blade 1000. The wind turbine blade 1000 comprises a leading edge 1800, a trailing edge 2000, a pressure side 2400, a suction side 2600, a first spar cap 7400, and a second spar cap 7600. The wind turbine blade 1000 comprises a chord line 3800 between the leading edge 1800 and the trailing edge 2000. The wind turbine blade 1000 comprises shear webs 4200, such as a leading edge shear web and a trailing edge shear web. The shear webs 4200 could alternatively be a spar box with spar sides, such as a trailing edge spar side and a leading edge spar side. The spar caps 7400, 7600 may comprise carbon fibres while the rest of the shell parts 2400, 2600 may comprise glass fibres.

Figure 2:
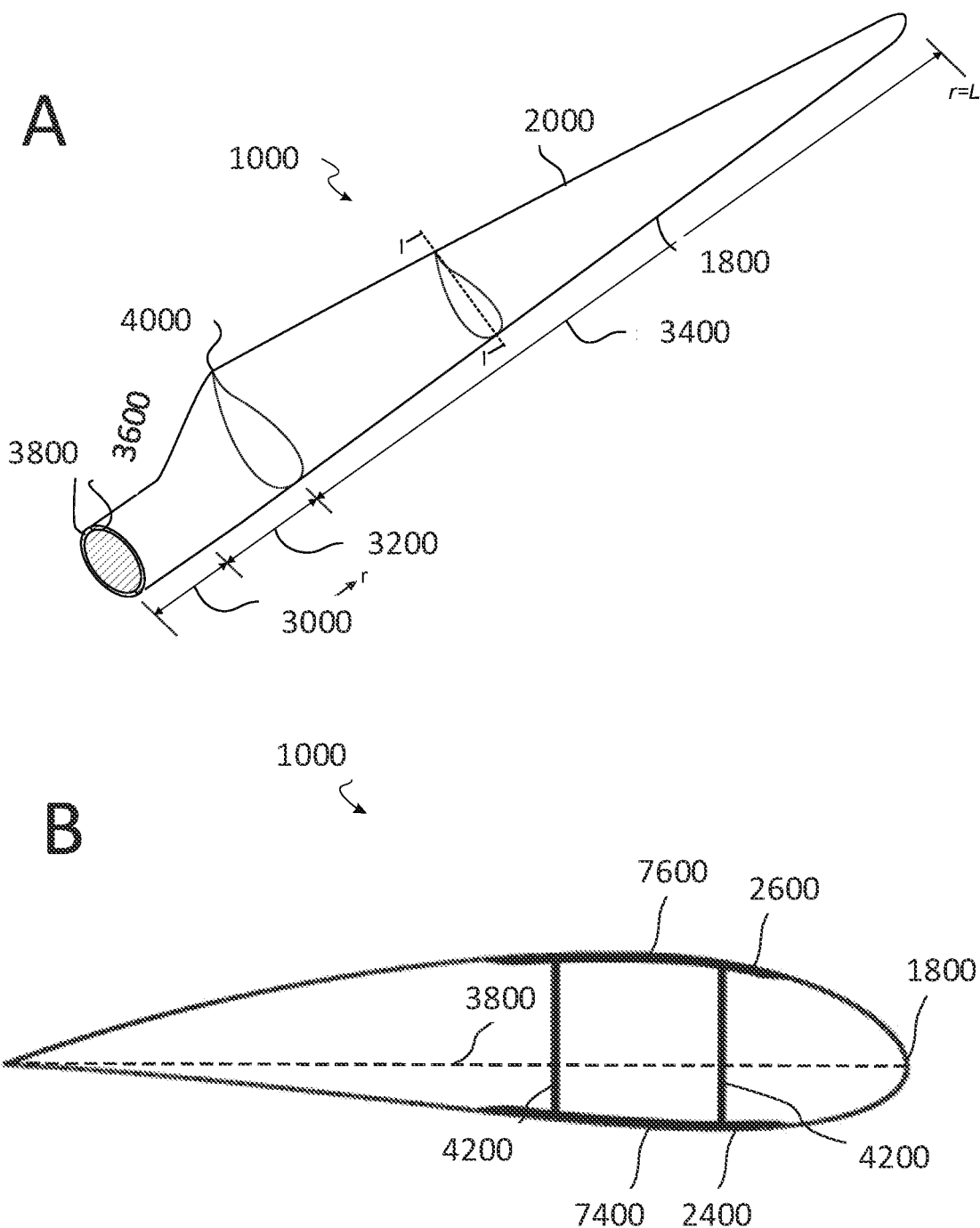
FIG. 2 is a schematic diagram illustrating a wind turbine blade and a spar cap structure arranged within the wind turbine blade.

FIG. 3A is a schematic diagram illustrating a cross sectional view of an interlayer 1 arranged between a first element 50, such as a first pultruded carbon element and a second element 60, such as a second pultruded carbon element, e.g. of a conductive fibre reinforced composite material. The elements 50, 60 and the interlayer 1 may form part of a spar cap 100 arranged in a wind turbine blade, such as the spar caps 7400, 7600 of the wind turbine blade 1000 as illustrated in FIG. 2.

FIG. 3B is a schematic diagram illustrating an exploded view of the interlayer 1 arranged between the first and second elements 50, 60. The interlayer 1, in the illustrated example, comprises an interlayer sheet 2 having an upper interlayer surface 3 and a lower interlayer surface 4. In the same way, the first element 50 has a first upper surface 51 and a first lower surface 52 and the second element 60 has a second upper surface 61 and a second lower surface 62.

The first element 50 and the second element 60 are arranged such that the first lower surface 52 of the first element 50 is facing the second upper surface 61 of the second element 60. The interlayer 1 and the interlayer sheet 2 is arranged between the lower surface of the first element 50 and the upper surface of the second element 60, e.g. such that the upper interlayer surface 3 is in contact with the first lower surface 52 and the lower interlayer surface 4 is in contact with the second upper surface 61.

FIG. 3C is a schematic diagram illustrating a cross-sectional view of a fibre reinforced composite material 100, e.g. spar cap or part of a spar cap, comprising a plurality of elements, such as pultruded carbon elements, including a first element 50, such as a first pultruded carbon element, and a second element 60, such as a second pultruded carbon element. The plurality of elements are arranged in an array with three rows of elements arranged adjacent to each other. Each row of elements are separated by an interlayer 1. The fibre reinforced composite material 100 may form part of a spar cap arranged in a wind turbine blade, such as the spar caps 7400, 7600 of the wind turbine blade 1000 as illustrated in FIG. 2. Although not specifically illustrated, interlayers may also be provided between adjacent elements in the width direction, to facilitate conductivity between elements also in this direction.

Figure 4:
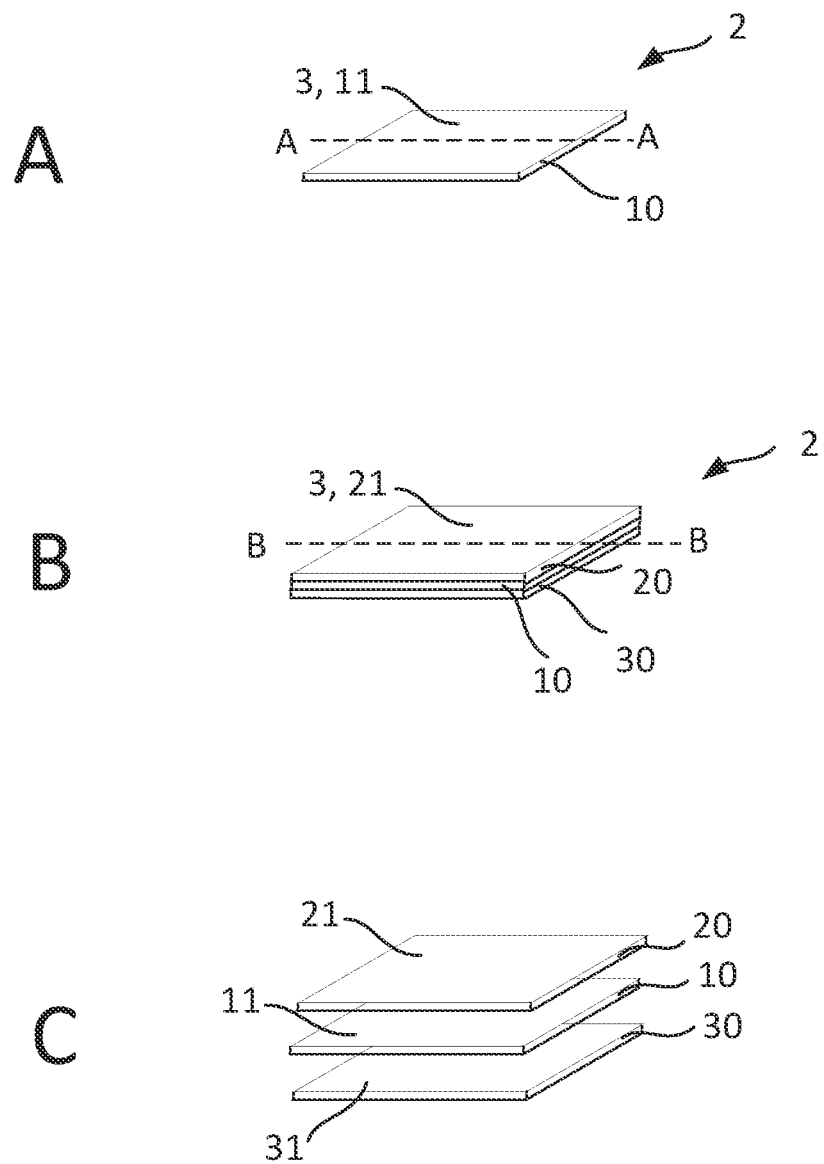
FIG. 4 is a schematic diagram illustrating a three-dimensional view of an interlayer sheet with one and three fibre layers respectively.
Figure 5:
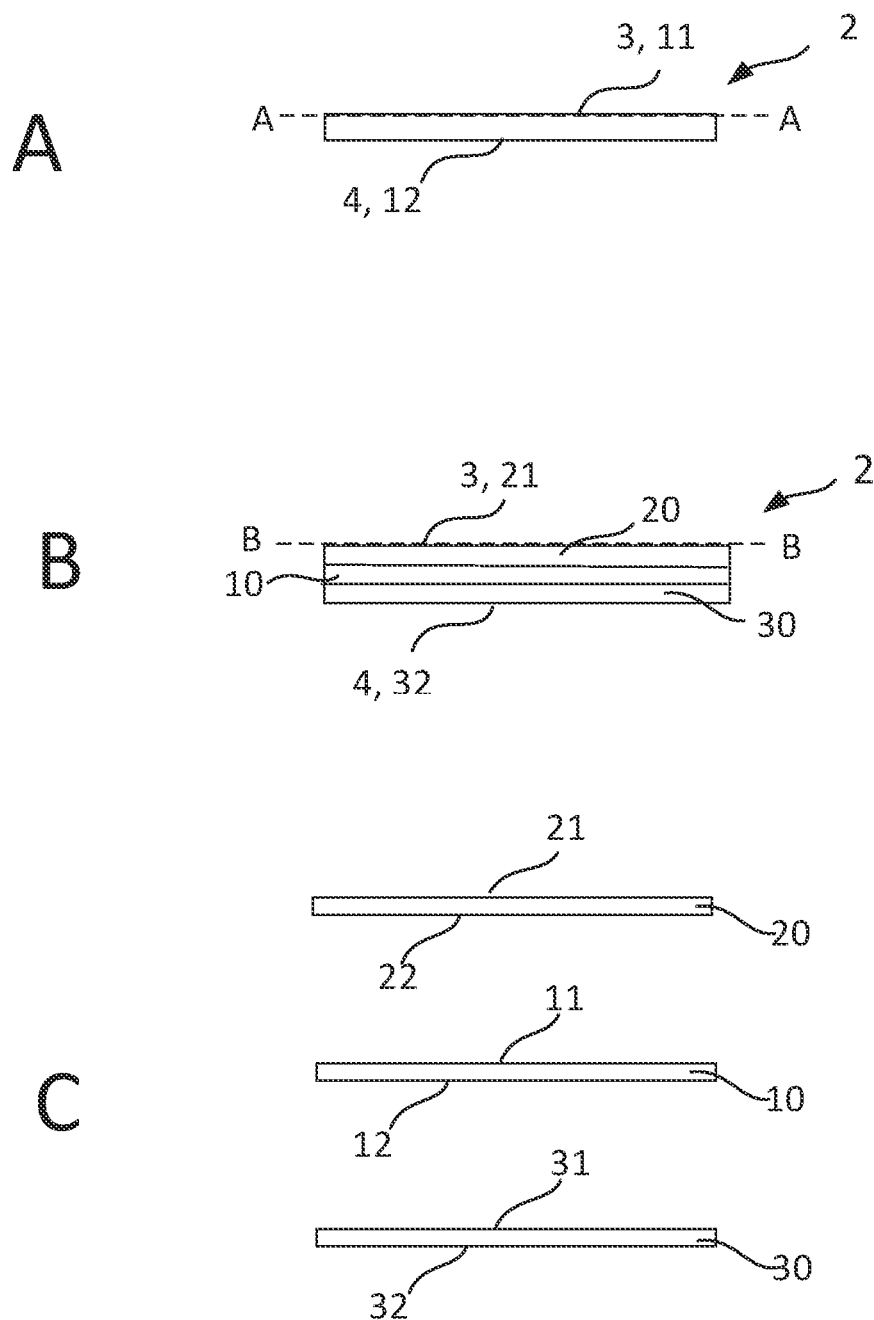
FIG. 5 is a schematic diagram illustrating a cross-sectional view of an interlayer sheet with one and three fibre layers respectively.
Figure 6:
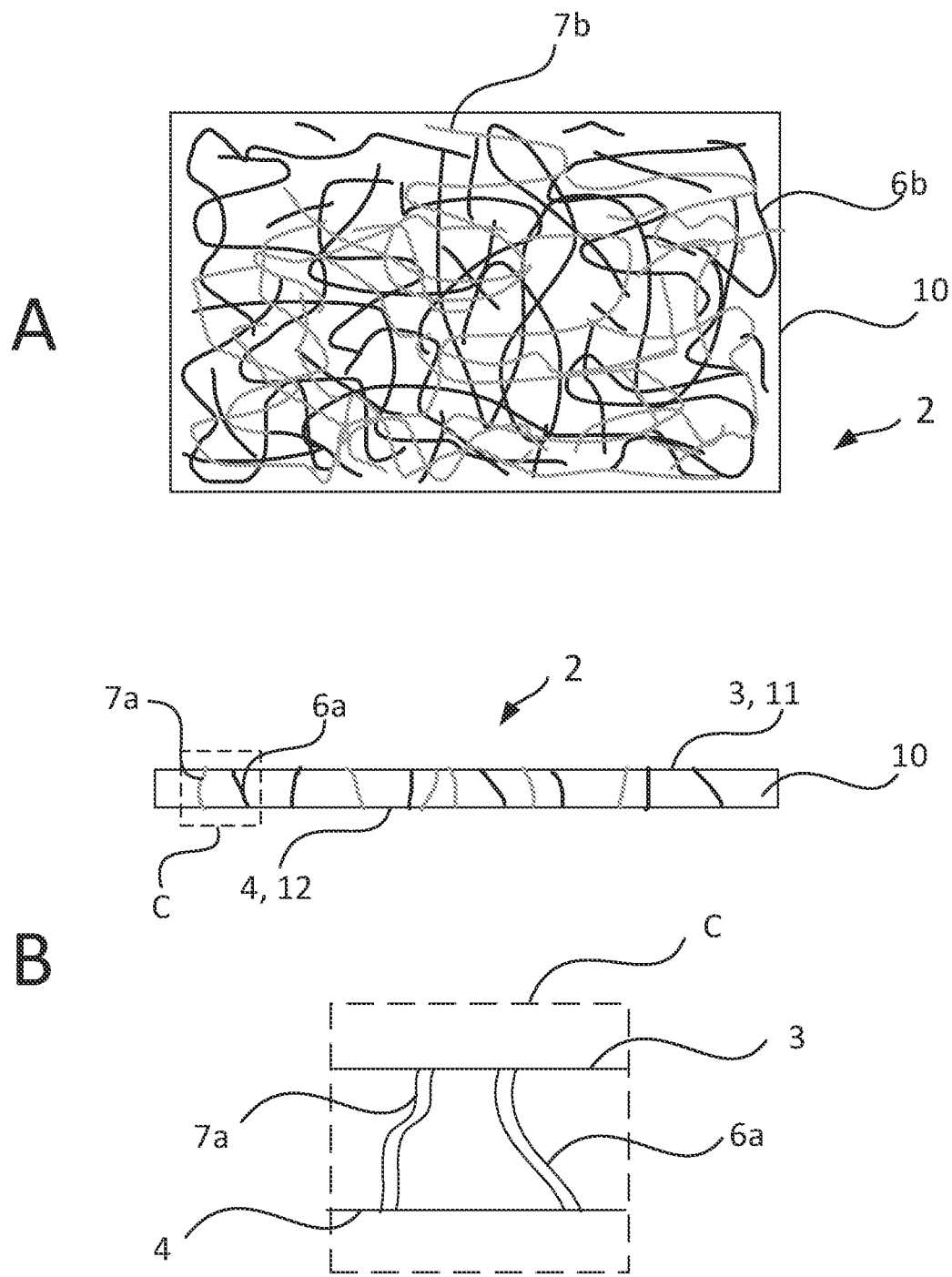
FIG. 6 is a schematic diagram illustrating a top view and a cross-sectional view of an interlayer sheet.
Figure 7:
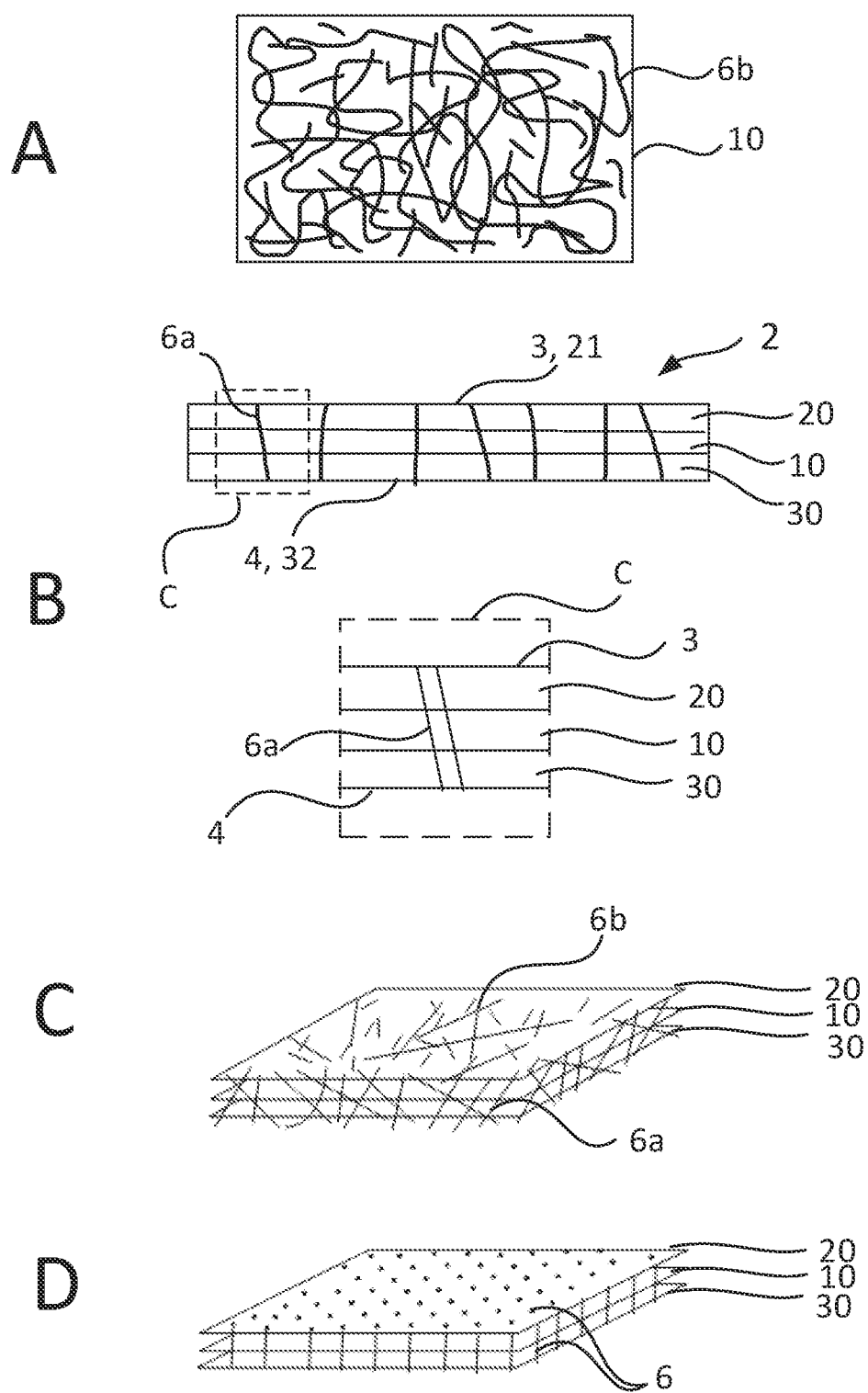
FIG. 7 is a schematic diagram illustrating a top view, a cross-sectional view and a three-dimensional view of an interlayer sheet.
Figure 8:
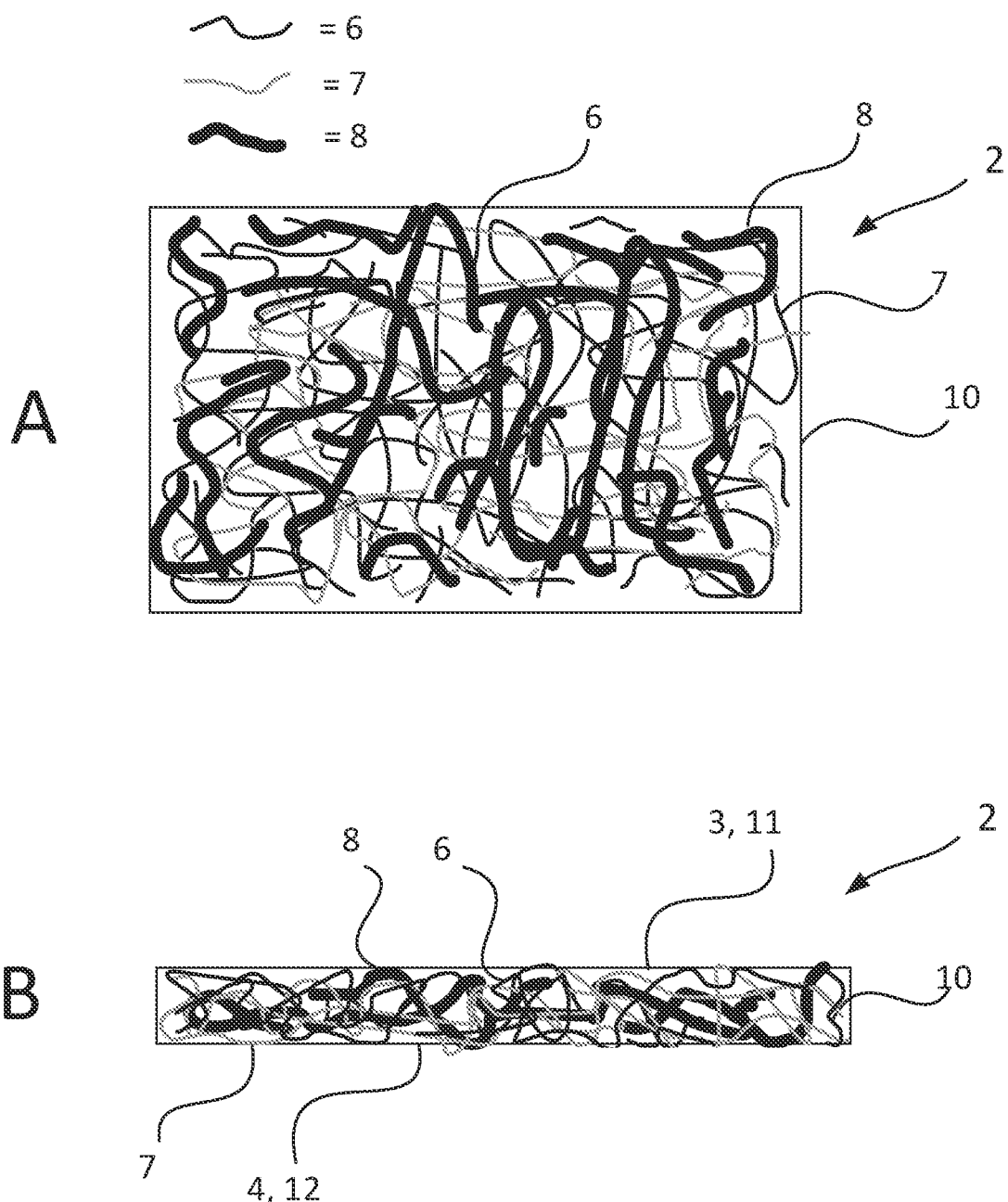
FIG. 8 is a schematic diagram illustrating a top view and a cross-sectional view of an interlayer sheet.
Figure 9:
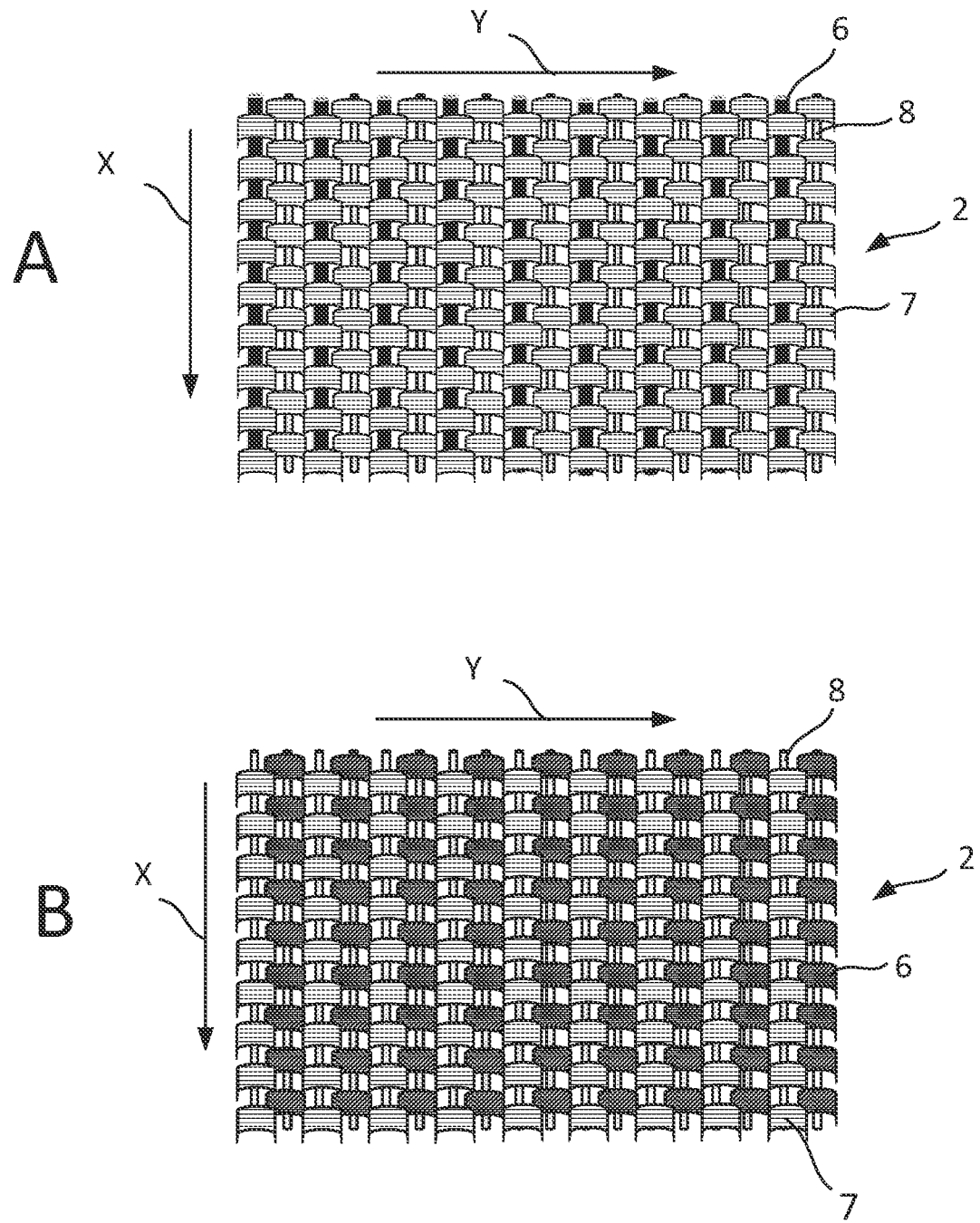
FIG. 9 is a schematic diagram illustrating an interlayer sheet.

FIGS. 4A and 4B is a schematic diagram illustrating a three-dimensional view of an exemplary interlayer sheet 2 according to two different embodiments, whereas FIGS. 5A and 5B shows a cross-sectional view through FIGS. 4A and 4B. In FIGS. 4C and 5C an exploded view of the embodiments shown in FIGS. 4B and 5B is illustrated.

In FIGS. 4A and 5A, the interlayer sheet 2 comprises one fibre layer i.e. the first fibre layer 10. In this case, the first upper fibre surface 11 is also the upper interlayer surface 3 and the first lower fibre surface 12 is also the lower interlayer surface 4.

In FIGS. 4B, 4C, 5B and 5C the interlayer sheet 2 comprises three fibre layers including a first fibre layer 10, a second fibre layer 20 and a third fibre layer 30.

The first fibre layer 10 have a first upper fibre surface 11 and a first lower fibre surface 12. The second fibre layer have a second upper fibre surface 21 and a second lower fibre surface 22 and the third fibre layer 30 have a third upper fibre surface 31 and a third lower fibre surface 32.

The first fibre layer 10 is arranged between the second fibre layer 20 and the third fibre layer 30. In this case, the third lower fibre surface 32 is also the lower interlayer surface 4 and the second upper fibre surface 21 is also the upper interlayer surface 3.

The first fibre layer 10 comprise a first plurality of fibres, the second fibre layer 20 comprise a second plurality of fibres and the third fibre layer 30 comprise a third plurality of fibres. The first plurality of fibres may comprise a first plurality of glass fibres and/or a first plurality of polymeric filaments, such as polyester filaments, preferably thermoplastic polyester filaments or polypropylene filaments or polyethylene filaments and/or a first plurality of carbon fibres (and/or another conductive fibre, e.g. metal fibre, such as copper fibre and/or steel fibre). In the same way the second plurality of fibres may comprise a second plurality of glass fibres and/or a second plurality of polymeric filaments, such as polyester filaments, preferably thermoplastic polyester filaments or polypropylene filaments or polyethylene filaments and/or a second plurality of carbon fibres (or another conductive fibre, e.g. metal fibre, such as copper fibre or steel fibre) and the third plurality of fibres may comprise a third plurality of glass fibres and/or a third plurality of polymeric filaments, such as polyester filaments, preferably thermoplastic polyester filaments or polypropylene filaments or polyethylene filaments and/or a third plurality of carbon fibres (or another conductive fibre, e.g. metal fibre, such as copper fibre or steel fibre).

The interlayer sheet 2 comprises a plurality of carbon fibres 6 (not illustrated in FIG. 4 or 5) forming part of the upper interlayer surface 3 as well as the lower interlayer surface 4. Thus, the plurality of carbon fibres 6 extends through the interlayer sheet 2, including the one or more layers 10, 20, 30 in one way or another. Reference is made to FIGS. 6-9 illustrating a plurality of different embodiments where the plurality of carbon fibres 6 form part of the upper interlayer surface 3 as well as the lower interlayer surface 4 of an interlayer sheet 2. The presence of the plurality of carbon fibres 6 extending through the interlayer sheet 2, is that the plurality of carbon fibres 6 may facilitate the transfer of electrons between two elements, e.g. two carbon elements, sandwiching the interlayer sheet 2, by providing indirect contact between such two elements. In this way, the interlayer sheet 2 protects the elements, e.g. containing conductive fibres, against lightning strikes. While embodiments are described with reference to carbon fibres 6, these may in alternative embodiments, within the scope of the present disclosure, be replaced by or mixed with other conductive fibres, e.g. metal fibres, such as copper fibres or steel fibres.

Preferably, the interlayer comprises 10-45 wt % carbon fibres, 5-50 wt % polymeric filaments and 15-50 wt % glass fibres. The polymeric filaments provide good surface properties to the interlayer sheet, such as good adherence properties. The glass fibres add stability and reinforcement to the interlayer sheet and the carbon fibres add conductivity.

FIG. 6A is a schematic diagram showing a top view of an embodiment of an interlayer sheet 2. FIG. 6B is a schematic diagram showing a cross-sectional view of the interlayer sheet 2 of FIG. 5A as well as a close-up of part C of the cross-sectional view of the interlayer sheet 2.

The interlayer sheet 2 comprises one fibre layer i.e. a first fibre layer 10. Thus, the first upper fibre surface 11 is also the upper interlayer surface 3 and the first lower fibre surface 12 is also the lower interlayer surface 4.

The first fibre layer 10 may be a non-woven fabric layer, e.g. essentially consisting of a first plurality of polymeric filaments, such as polyester filaments. Such a layer has good surface properties, including good adherence properties. For example, the first fibre layer 10 may be a polyester surface veil.

The interlayer sheet 2 further comprises a plurality of carbon fibres 6 and a plurality of glass fibres 7, including short and/or continuous fibres with varying sizes. The plurality of carbon fibres 6 and the plurality of glass fibres 7 each comprise several parts, including a first part 6a, 7a and a second part 6b, 7b. The second part 6b, 7b of each of the plurality of carbon fibres 6 and the plurality of glass fibres 7 are randomly arranged at the first upper surface 11 of the first fibre layer 10 and forms part of the upper interlayer surface 3, whereas a first part 6a, 7a of each of the plurality of carbon fibres 6 extends through the first layer 10 and thereby also forms part of the lower interlayer surface 4.

For example, the plurality of carbon fibres 6 and/or the plurality of glass fibres 7 may be provided by spraying them onto the first fibre layer 10 in a direction substantially perpendicular to the surface of the first fibre layer, e.g. using pressurised air. Thereby at least some of the ends of the carbon and/or glass fibres may upon impact with the layer extend into and through the layer.

FIG. 6B illustrates how a first part 6a, 7a of each of the plurality of carbon fibres 6 and glass fibres 7 extends from the upper interlayer surface 3 through the first layer 10 and thereby also forms part of the lower interlayer surface 4. The glass fibres 7 extending through the first fibre layer 10 adds stability and reinforcement to the interlayer sheet 2. Due to the plurality of carbon fibres 6 extending through the first layer 10, the interlayer sheet 2 is conductive when arranged between two elements, such as carbon elements, such as between two pultruded carbon elements, of a spar cap arranged in a wind turbine blade shell.

FIG. 7A is a schematic diagram showing a top view of an embodiment of an interlayer sheet 2. FIG. 7B is a schematic diagram showing a cross-sectional view of the interlayer sheet 2 of FIG. 7A.

The interlayer sheet 2 comprises three fibre layers including a first fibre layer 10, a second fibre layer 20 and a third fibre layer 30. The first fibre layer 10 have a first upper fibre surface 11 and a first lower fibre surface 12. The second fibre layer have a second upper fibre surface 21 and a second lower fibre surface 22 and the third fibre layer 30 have a third upper fibre surface 31 and a third lower fibre surface 32.

The first fibre layer 10 is arranged between the second fibre layer 20 and the third fibre layer 30. In this case, the third lower fibre surface 32 is also the lower interlayer surface 4 and the second upper fibre surface 21 is also the upper interlayer surface 3.

The first fibre layer 10 may be a non-woven fabric layer essentially consisting of a first plurality of glass fibres. The glass fibres 7 adds stability and reinforcement to the interlayer sheet 2.

The second fibre layer and third fibre layers 20, 30 are also non-woven fabrics. Preferably, the second fibre layer 20 essentially consist of a first plurality of polymeric filaments, such as polyester filaments. Such a layer adds good surface properties to the interlayer sheet 2, including good adherence properties. Furthermore, the third fibre layer 30 essentially consist of a first plurality of polymeric filaments, such as polyester filaments. As a result, both outer surfaces of the interlayer sheet 2 have good adherence properties.

The interlayer sheet 2 further comprise a plurality of carbon fibres 6. The plurality of carbon fibres 6 may be short and/or continuous fibres with varying sizes. The plurality of carbon fibres 6 each comprises several parts, including a first part 6a and a second part 6b. The second part 6b of each of the plurality of carbon fibres 6 are randomly arranged at the second upper surface 21 of the second fibre layer 20 and forms part of the upper interlayer surface 3, whereas a first part 6a of each of the plurality of carbon fibres 6 extends through the first, second and third fibre layers 10, 20, 30, such that the carbon fibres 6 also forms part of the lower interlayer surface 4.

FIG. 7B illustrates how a first part 6a of each of the plurality of carbon fibres 6 extends from the upper interlayer surface 3 through the first, second and third fibre layer 10, 20, 30, such that the carbon fibres 6 also forms part of the lower interlayer surface 4. Due to the plurality of carbon fibres 6, extending through the first layer 10, the interlayer sheet 2 is conductive in the direction perpendicular to the plane of the interlayer sheet 2. Thus, when arranged between two elements, e.g. carbon elements, such as between two pultruded carbon elements, of a spar cap arranged in a wind turbine blade shell, the interlayer sheet 2 prevents or reduce build up of a voltage potential between the elements.

FIG. 7C illustrates that the plurality of carbon fibres 6 may be punched through the interlayer sheet 2, e.g. using pressurised air, and thus extend through the first, second and third fibre layer 10, 20, 30 in random directions. Alternatively, as illustrated in FIG. 7D, the fibre layers 10, 20, 30 may be stitched together by the plurality of carbon fibres 6, forming a controlled pattern of carbon fibres 6 extending through the interlayer sheet 2. In the later embodiment, the plurality of carbon fibres 6 holds the three fibre layers 10, 20, 30 together and at the same time adds conductivity to the interlayer sheet 2.

FIG. 8A is a schematic diagram showing a top view of an embodiment of an interlayer sheet 2. FIG. 8B is a schematic diagram showing a cross-sectional view of the interlayer sheet 2 of FIG. 8A.

The interlayer sheet 2 comprises one fibre layer i.e. a first fibre layer 10 comprising a first upper fibre surface 11 and a first lower fibre surface 12. Thus, the first upper fibre surface 11 is also the upper interlayer surface 3 and the first lower fibre surface 12 is also the lower interlayer surface 4 of the interlayer sheet 2.

The first fibre layer 10 may be a non-woven fabric and comprises a first plurality of fibres, including a first plurality of carbon fibres 6 (illustrated by a black thin line), a first plurality of glass fibres 7 (illustrated by a grey thin line) and a first plurality of polymeric filaments 8 (illustrated by a black thick line). The first fibre layer 10 may further comprise a binding agent, preferably a binding agent being dissolvable by a resin, maintaining arrangement of the first plurality of fibres relative to each other. Alternatively or in addition, the first plurality of fibres may be stitched together, optionally with a carbon fibre thread, to maintain arrangement of the first plurality of fibres relative to each other.

The first plurality of fibres 6, 7, 8 are randomly oriented within the first fibre layer 10. Due to the random arrangement of fibres in a single layer, at least a plurality 6 of the first plurality of carbon fibres will form part of the upper interlayer surface 3 as well as the lower interlayer surface 4, making the interlayer sheet 2 conductive when arranged between two elements, e.g. carbon elements, such as between two pultruded carbon elements, of a spar cap arranged in a wind turbine blade shell.

FIGS. 9A and 9B are schematic illustrations of two different embodiments of an interlayer sheet 2 comprising a first layer 10 being a woven fabric.

The first fibre layer 10 comprises a first upper fibre surface 11 and a first lower fibre surface 12. Thus, the first upper fibre surface 11 is also the upper interlayer surface 3 and the first lower fibre surface 12 is also the lower interlayer surface 4 of the interlayer sheet 2.

The first fibre layer 10 comprises a first plurality of fibres including a first plurality of carbon fibres 6, a first plurality of glass fibres 7 and a first plurality of polymeric filaments 8. The first plurality of fibres 6, 7, 8 are woven together.

The first plurality of glass fibres 7 is arranged in a plurality of glass fibre bundles and the first plurality of carbon fibres 6 are arranged in a plurality of carbon fibre bundles.

Each of the first plurality of carbon fibres 6 is arranged along a first length direction, each of the first plurality of glass fibres 7 are arranged along a second length direction and each of the first plurality of polymeric filaments 8 are arranged along a third length direction.

In FIG. 9A, the first plurality of carbon fibres 6 and the first plurality of polymeric filaments 8 are arranged parallelly and both extend in a first direction X, whereas the first plurality of glass fibres 7 extend in a second direction Y, which is perpendicular to the first direction X. Thus, the first and third length directions are parallel, i.e. parallel with the first direction X, and the second length direction is perpendicular to the first and third length directions. Hence, the second length direction is parallel with the second direction Y. In an alternative embodiment (not illustrated) a number of carbon fibres may be added in the first direction X along the first plurality of glass fibres 7 to further enhance electrical conductivity through the plane.

In FIG. 9B, the first plurality of carbon fibres 6 and the first plurality of glass fibres 7 are arranged parallelly and extend in the second direction Y, whereas the first plurality of polymeric filaments 8 extend in the first direction X, which is perpendicular to Y. Thus, the first length direction and second length direction are parallel, i.e. parallel with the second direction Y, and the third length direction is perpendicular to the first and second length directions. Hence, the third length direction is parallel with the first direction X.

In FIG. 9B, the first plurality of carbon fibres 6 and the first plurality of glass fibres 7 are arranged parallelly and extend in the second direction Y, whereas the first plurality of polymeric filaments 8 extend in the first direction X, which is perpendicular to Y.

Figure 3:
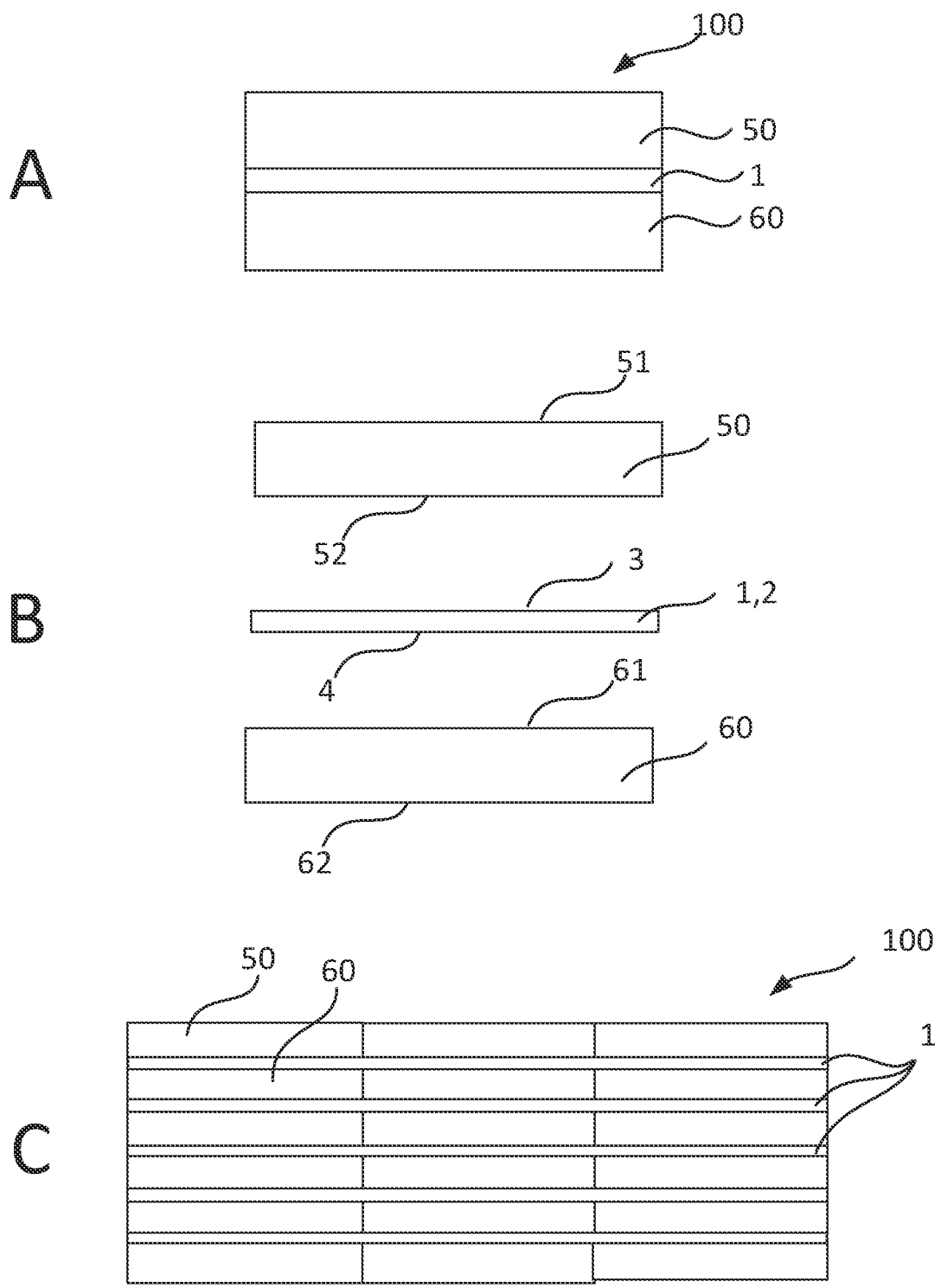
FIG. 3 is a schematic diagram illustrating a cross-sectional view of an interlayer arranged between elements.
Figure 10:
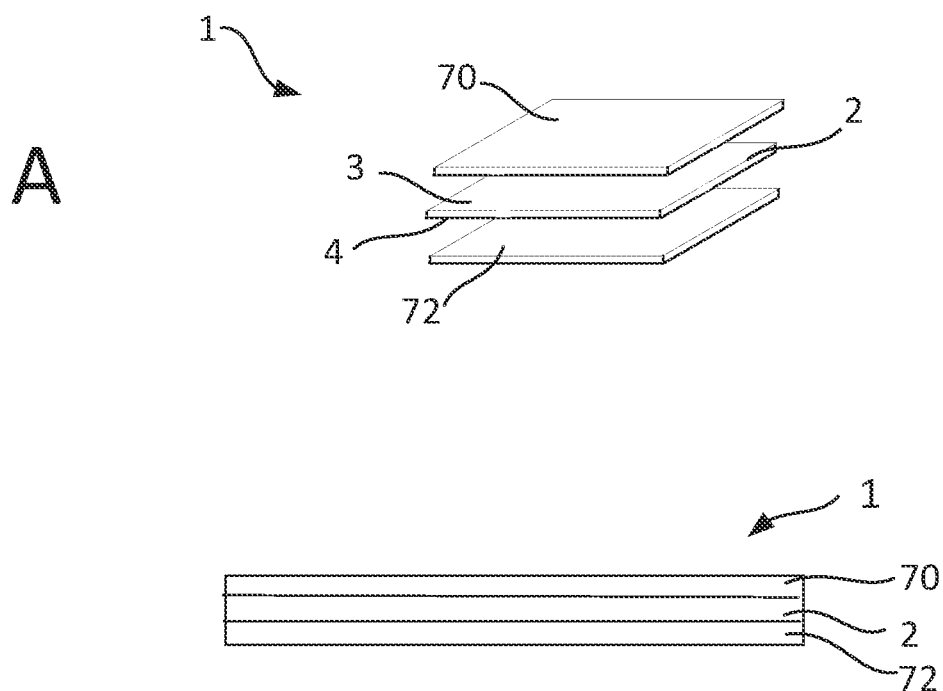
FIG. 10 is a schematic diagram illustrating an exemplary interlayer.

FIG. 10A is a schematic diagram illustrating an exemplary interlayer 1, such as the interlayer 1 as described, e.g. with reference to FIG. 3. FIG. 10 illustrates that the interlayer 1 may comprise a top sheet 70 and/or a bottom sheet 72, e.g. in addition to the interlayer sheet 2 as described with respect to FIGS. 4-9.

The top sheet 70 is arranged adjacent the upper interlayer surface 3 and the bottom sheet 72 is arranged adjacent the lower interlayer surface 4. The interlayer sheet 2 may be sandwiched between the top sheet 70 and the bottom sheet 72.

FIG. 10B is a cross-sectional view of the interlayer 1 illustrated in FIG. 10A.

The top sheet 70 and/or bottom sheet 72 may for example be carbon veils, since such veils facilitates electrical conductivity through the plane. Furthermore, a carbon veil has high permeability, promotes resin infusion and have good adhesion properties. Alternatively, the top sheet 70 and/or bottom sheet 72 may be polyester veils, since such veils have good adhesion properties. In such case the top sheet 70 and/or bottom sheet 72 may comprise conductive elements, such as conductive fibres, such as carbon fibres. The presence of conductive fibres, such as carbon fibres, in the top sheet 70 and/or bottom sheet 72 facilitates the electrical connection through the interlayer, such as facilitates electron flow between elements, such as pultruded elements, when sandwiched therebetween.

Figure 11:
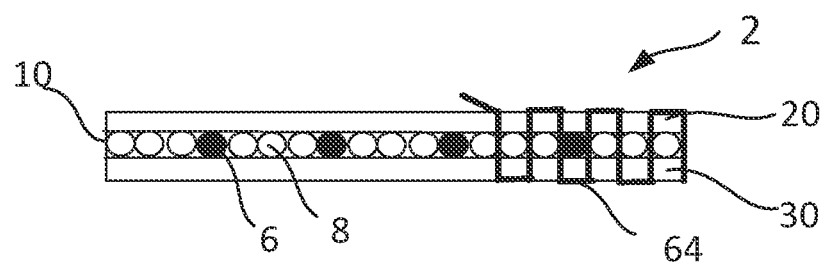
FIG. 11 is a schematic diagram illustrating a cross-sectional view of an exemplary interlayer sheet.

FIG. 11 illustrates a cross-sectional view of an embodiment of an interlayer sheet 2, wherein the interlayer sheet 2 comprises a first fibre layer 10, a second fibre layer 20 and a third fibre layer 30. The first fibre layer 10 comprises a plurality of polymeric fibres 8 and carbon fibre bundles 6 arranged along a first length direction. The carbon fibre bundles 6 are illustrated as black dots, whereas the polymeric filaments 8 are illustrated as white dots. As can be seen in FIG. 11, every 4th fibre bundle is a carbon fibre bundle 6, whereas the remaining fibres are polymeric filaments 8. In other exemplary embodiments, there may be more or less polymeric filaments between each carbon fibre bundle.

The second fibre layer 20 and/or the third fibre layer 30 are preferably polyester surface veils or carbon surface veils. The first fibre layer 10, the second fibre layer 20 and the third fibre layer 30 are stitched or woven together. The thick black line illustrates a thread 64, e.g. a fibre, such as a glass fibre or a carbon fibre, extending along the second length direction and stitching or weaving the carbon fibres 6 and polymeric filaments 8 arranged along the first length direction together with the second fibre layer 20 and the third fibre layer 30. The thread 64 may be a conductive fibre and in this way, the interlayer sheet 2 may have conductive properties, even though the second fibre layer 20 and/or the third fibre layer 30 essentially consist of a non-conductive material. In some exemplary embodiments, a plurality of threads 64 may be used along the length of the interlayer sheet 2, and in such situation the plurality of threads 64 may comprise some conductive threads and some non-conductive threads, e.g. every 10th thread may be a conductive thread while the remaining threads may be non-conductive.

The disclosure has been described with reference to a preferred embodiment. However, the scope of the invention is not limited to the illustrated embodiment, and alterations and modifications can be carried out without deviating from the scope of the invention.

Throughout the description, the use of the terms "first", "second", "third", "fourth", "primary", "secondary", "tertiary" etc. does not imply any particular order or importance but are included to identify individual elements. Furthermore, the labelling of a first element does not imply the presence of a second element and vice versa.

REFERENCE SIGNS 1 interlayer
2 interlayer sheet
3 upper interlayer surface
4 lower interlayer surface
5 fibre layer plane
6 plurality of carbon fibres
6a First part
6b Second part
7 plurality of glass fibres
7a first part
7b second part
8 plurality of polymeric filaments
10 first fibre layer
11 first upper fibre surface
12 first lower fibre surface
13 first plurality of carbon fibres
14 first plurality of glass fibres
15 first plurality of polymeric filaments
18 Third length direction
20 second fibre layer
21 second upper fibre surface
22 second lower fibre surface
23 second plurality of carbon fibres
24 second plurality of glass fibres
25 second plurality of polymeric filaments
30 third fibre layer
31 third upper fibre surface
32 third lower fibre surface
33 third plurality of carbon fibres
34 third plurality of glass fibres
35 third plurality of polymeric filaments
40 spar cap
50 first element
51 first upper surface
52 first lower surface
60 second element
61 second upper surface
62 second lower surface
64 thread
70 top sheet
72 bottom sheet
100 spar cap
200 wind turbine
400 tower
600 nacelle
800 hub
1000 blade
1400 blade tip
1600 blade root
1800 leading edge
2000 trailing edge
2200 pitch axis
2400 pressure side
2600 suction side
3000 root region
3200 transition region
3400 airfoil region
3800 chord line
4000 shoulder/position of maximum chord
4200 shear webs
7400 first spar cap
7600 second spar cap
X first direction
Y second direction

The invention claimed is:

1. An interlayer, comprising an interlayer sheet comprising one or more fibre layers extending in a fibre layer plane, the one or more fibre layers including a first fibre layer comprising a first plurality of fibres and having a first upper fibre surface and a first lower fibre surface, wherein the interlayer sheet has an upper interlayer surface and a lower interlayer surface and wherein the interlayer comprises a plurality of extending conductive fibres, wherein each of the plurality of extending conductive fibres forms part of the upper interlayer surface as well as the lower interlayer surface, wherein the interlayer is configured for arrangement between a first element and a second element of a conductive material, and wherein a first part of each of the plurality of extending conductive fibres extends through the one or more fibre layers, and wherein each of the extending conductive fibres extends between the first upper fibre surface and the first lower fibre surface.

2. The interlayer according to claim 1, wherein the plurality of extending conductive fibres is a plurality of carbon fibres.

3. The interlayer according to claim 1, wherein the first plurality of fibres comprises a first plurality of conductive fibres.

4. The interlayer according to claim 3, wherein the first plurality of conductive fibres comprises a first plurality of carbon fibres.

5. The interlayer according to claim 1, wherein the first plurality of fibres comprises a first plurality of glass fibres.

6. The interlayer according to claim 5, wherein the first fibre layer essentially consists of the first plurality of glass fibres.

7. The interlayer according to claim 6, wherein the first plurality of fibres comprises a first plurality of conductive fibres and a first plurality of polymeric filaments, wherein each of the first plurality of conductive fibres is arranged along a first length direction, each of the first plurality of glass fibres are arranged along a second length direction and each of the first plurality of polymeric filaments are arranged along a third length direction.

8. The interlayer according to claim 5, wherein the first plurality of fibres comprises a first plurality of conductive fibres and a first plurality of polymeric filaments, wherein the first plurality of glass fibres is arranged in a plurality of glass fibre bundles and the first plurality of conductive fibres are arranged in a plurality of conductive fibre bundles, wherein the first fibre layer comprises alternating glass fibre bundles and conductive fibre bundles in a first length direction.

9. The interlayer according to claim 1, wherein the first plurality of fibres comprises a first plurality of polymeric filaments.

10. The interlayer according to claim 9, wherein the first fibre layer essentially consists of the first plurality of polymeric filaments, wherein the first plurality of polymeric filaments are optionally maintained relative to each other by a binder.

11. The interlayer according to claim 9, wherein the first plurality of polymeric filaments is selected from the group consisting of thermoplastic polyester filaments, polypropylene filaments and polyethylene filaments.

12. The interlayer according to claim 1, wherein the first upper fibre surface is also the upper interlayer surface and the first lower fibre surface is also the lower interlayer surface.

13. The interlayer according to claim 1, wherein the one or more fibre layers further include a second fibre layer having a second upper fibre surface and a second lower fibre surface, and a third fibre layer having a third upper fibre surface and a third lower fibre surface.

14. The interlayer according to claim 13, wherein the first fibre layer is arranged between the second fibre layer and the third fibre layer, and wherein the second lower fibre surface is also the lower interlayer surface and the third upper fibre surface is also the upper interlayer surface.

15. The interlayer according to claim 13, wherein the second fibre layer comprises a second plurality of fibres, including a second plurality of polymeric filaments, and/or the third fibre layer comprises a third plurality of fibres including a third plurality of polymeric filaments.

16. The interlayer according to claim 15, wherein the second fibre layer essentially consists of the second plurality of polymeric filaments optionally maintained relative to each other by a binder and/or the third fibre layer essentially consists of the third plurality of polymeric filaments optionally maintained relative to each other by a binder.

17. The interlayer according to claim 15, wherein the first fibre layer and the second fibre layer and/or the third fibre layer, are stitched together by the plurality of extending conductive fibres.

18. The interlayer according to claim 15, wherein the second plurality of polymeric filaments is selected from the group consisting of thermoplastic polyester filaments, polypropylene filaments and polyethylene filaments.

19. The interlayer according to claim 15, wherein the third plurality of polymeric filaments is selected from the group consisting of thermoplastic polyester filaments, polypropylene filaments and polyethylene filaments.

20. The interlayer according to claim 1, wherein a second part of each of the plurality of extending conductive fibres is arranged randomly at the upper interlayer surface.

21. The interlayer according to claim 1, wherein the first plurality of fibres are stitched together with one or more threads, including a first conductive fibre thread.

22. The interlayer according to claim 1, comprising a top sheet and/or a bottom sheet, and wherein the top sheet is arranged adjacent the upper interlayer surface and/or the bottom sheet is arranged adjacent the lower interlayer surface.

23. A spar cap for a wind turbine blade comprising a plurality of elements including the first element and the second element of the conductive material, wherein the conductive material comprises a conductive fibre reinforced composite material, and wherein the interlayer according to claim 1 is arranged between the first element and the second element.

24. The spar cap according to claim 23, wherein each of the plurality of elements has a length in a longitudinal direction, a width in a width direction, and a height in a height direction, wherein the length is longer than the width and the width is longer than the height, wherein each of the plurality of elements has a lower surface and an upper surface extending in the longitudinal direction and the width direction, and wherein the first element and the second element are arranged such that the lower surface of the first element is facing the upper surface of the second element, the interlayer is being arranged between the lower surface of the first element and the upper surface of the second element.

* * * * *